T. MIDGLEY.
OVERFLOW CAVITY FOR MOLDS.
APPLICATION FILED AUG. 11, 1919.
1,346,232.
Patented July 13, 1920.
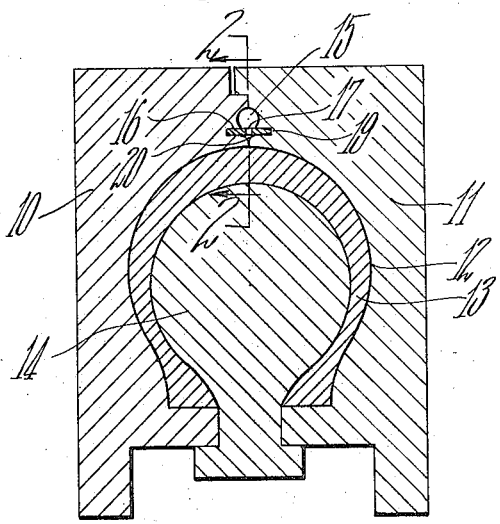
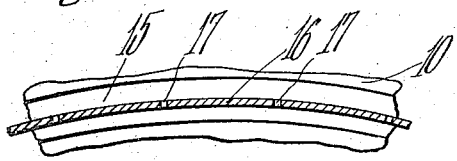
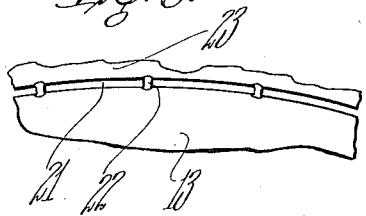
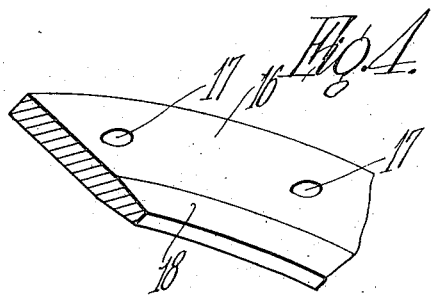
INVENTOR
Thomas Midgley.
BY
Chapin & Neal
ATTORNEYS.

UNITED STATES PATENT OFFICE.

THOMAS MIDGLEY, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

OVERFLOW-CAVITY FOR MOLDS.

1,346,232.   Specification of Letters Patent.   Patented July 13, 1920.

Application filed August 11, 1919. Serial No. 316,666.

*To all whom it may concern:*

Be it known that I, THOMAS MIDGLEY, a citizen of the United States of America, residing at Springfield, in the county of Hampden and State of Massachusetts, have invented certain new and useful Improvements in Overflow-Cavities for Molds, of which the following is a specification.

My invention relates to molds for compressing plastic substances. More specifically it relates to the design of the overflow cavity generally provided at the periphery of the annular molds used in vulcanizing automobile tire casings.

It has for its object a mold which will so shape the fin or overflow present at the outer circumference of molded tires that its removal will be facilitated. It has for a further object a mold which will have an overflow cavity presenting substantially the same area for the passage of the surplus plastic material during the closing movement of the mold. It has for a further object a mold which will insure a more even distribution of the plastic material than is the case with molds of the usual types.

To these ends my invention is embodied in its preferred form as shown in the accompanying drawings, in which—

Figure 1 is a transverse section through an annular mold having an overflow cavity formed according to my invention;

Fig. 2 is a fragmentary section on line 2—2 of Fig. 1;

Fig. 3 is a fragmentary elevation of the outer circumference of a tire vulcanized in my improved mold; and Fig. 4 is a detail of an element of the mold.

My invention will be described in connection with molds in which automobile tires are vulcanized, although it will be understood that it is equally applicable to other types of molds in which an overflow for surplus compressed material is provided. The mold as shown is composed of two sections 10 and 11 combining to present a cavity 12 shaped to give the desired conformation to a tire casing 13 mounted on a core or waterbag 14. The mold sections are in practice pressed together by any suitable means well known in the art, and in so doing compress the tire casing, forcing a small portion of the plastic material radially outwardly in the form of a peripheral fin at the point where the mold sections come together. It has been customary to provide an annular cavity 15 at this point to receive the surplus rubber which is extruded from between the mold sections.

Molds of this type, however, are subject to the following disadvantages. Tire casings are necessarily made slightly larger in their raw state than the size they are ultimately to assume. When mold pressure is applied to this oversized tire the outer edges of the mold cavity will tend to carry the excess material toward the center of the tread. The rubber thus carried along will be forced outwardly into the cavity 15, but this will soon be filled, leaving the excess rubber at the tread with no means of escape. This will cause an unduly large fin at the center of the tire and will prevent the complete closing of the mold sections. Due both to this latter effect and to the previous removal of material by the edges of the mold cavity there will be a lack of material, or a "shy spot" on the sides of the tread.

I have overcome these difficulties by placing between the overflow cavity 15 and the mold cavity 12 an annular member such as a plate 16 provided with a series of radial apertures 17. These apertures may be of any convenient size and separation, but I have found, for the ordinary size of molds, that apertures approximately one-eighth of an inch in diameter spaced about two inches apart give good results. For convenience the plate is attached to one of the mold sections, as 10, by fitting it tightly into an annular groove, although it may be formed as a member integral therewith if desired. The other edge of the plate is preferably tapered as at 18 so that it may readily fit into an annular groove 19 in the opposing mold section.

The function of the plate is as follows. When the mold sections first contact against the tire, plate 16 is in substantial engagement with the groove 19. The only escape for the surplus material will be therefore through the apertures 17. Without the plate any rubber forced toward the center by the edges of the mold cavity would find an easy exit between the comparatively widely spaced mold sections, but the plate acts to restrain this rubber and hold a large part of it from being forced out. Further closing movement of the mold sections will cause slipping over the compressed rubber rather than its ejection. The rubber is allowed to escape slowly, and by the time the mold sections are entirely closed all the surplus material will have been expelled.

It has been found in practice that with a mold constructed according to my invention only a fraction of the overflow occurs which was formerly the case, and "shy spots" on the tire are practically eliminated. As the mold sections are not held apart by the excess rubber crowded between them they close tightly, and the finished product is more consistently true to size than was formerly the case. To aid the sections in closing together the abutting edges of the mold sections are preferably flared outwardly as at 20. This forces the rubber held between the sections into cavity 15 and practically cuts off the fin where it joins the body of the tire casing. This latter feature greatly facilitates the labor of severing the fin of surplus material from the tire. As will be evident from Figs. 1 and 3, the fin 21 immediately adjacent the casing 13 will be very thin save for enlargements 22 caused by apertures 17, the bulk of the overflow being confined to an irregular mass 23 extruded through the apertures into the overflow cavity 15. A fin of this form is much more easily severed from the tire than a thick band of rubber such as usually resulted in the use of the former type of mold.

I claim—

1. A compression mold for tire casings comprising sections adapted to be moved toward each other, and a restricted overflow opening between the sections presenting a substantially constant area during the compressing movement of the mold.

2. A compression mold for tire casings comprising a pair of annular sections presenting a molding cavity, an annular overflow cavity formed in the abutting faces of the sections, a member interposed between the said overflow cavity and said molding cavity and provided with a plurality of apertures, said member being secured to one of said sections, a groove in the opposing mold section adapted to receive said member, and a flared opening directed toward the member and interposed between the member and the molding cavity.

3. A compression mold for tire casings comprising a pair of annular sections presenting a molding cavity, an annular overflow cavity formed in the abutting faces of the sections, a member interposed between the said overflow cavity and said molding cavity and provided with a plurality of apertures, said member being secured to one of said sections, and a groove in the opposing mold section adapted to receive said member.

4. A compression mold for tire casings comprising a pair of annular sections presenting a molding cavity, an annular overflow cavity formed in the abutting faces of the sections, and a member interposed between the said overflow cavity and said molding cavity and provided with a plurality of apertures.

5. A mold for compressing plastic substances comprising relatively movable sections and an overflow opening presenting an area less than that between the edges of the mold sections.

6. A mold for compressing plastic substances comprising relatively movable sections and an overflow opening between said sections presenting a substantially uniform area during the compressing movement of the mold sections.

7. A mold for compressing plastic substances comprising relatively movable sections, and a member interposed between the sections and having a plurality of overflow openings therein.

8. A mold for compressing plastic substances comprising relatively movable sections and a member secured to one section and having sliding contact with an adjacent section, said member having a plurality of overflow openings therein.

9. A compression mold for tire casings having a pair of annular sections adapted for movement toward and away from each other, and a member interposed between said sections and having a plurality of overflow openings therein.

10. A compression mold for tire casings having a pair of annular sections adapted for movement toward and away from each other, and a member secured to one section and having sliding contact with the opposing section, said member having a plurality of overflow openings therein.

11. A compression mold for tire casings having a pair of annular sections adapted for movement toward and away from each other, a member secured to one section and having a plurality of overflow openings therein, and a groove in the opposing section adapted to receive said member.

12. A compression mold for tire casings comprising a pair of annular sections adapted for movement toward and away from each other, and an overflow opening between the sections having an area less than that between the mold sections.

13. A compression mold for tire casings comprising a pair of annular sections presenting a molding cavity, an annular overflow cavity formed in the abutting faces of the sections, and a flared opening directed toward the overflow cavity and interposed between the two cavities.

THOMAS MIDGLEY.